United States Patent [19]

Tsuchiya et al.

[11] 4,401,325
[45] Aug. 30, 1983

[54] FLEXIBLE PIPE COUPLING

[75] Inventors: Kazuo Tsuchiya; Hirotsugu Masuda, both of Yokohama; Yuji Sakaguchi, Tokyo, all of Japan

[73] Assignee: Bridgestone Tire Co., Ltd., Tokyo, Japan

[21] Appl. No.: 251,842

[22] Filed: Apr. 8, 1981

[30] Foreign Application Priority Data

Apr. 28, 1980 [JP] Japan .............................. 55-58449[U]

[51] Int. Cl.³ .............................................. F16L 27/10
[52] U.S. Cl. ........................... 285/231; 285/DIG. 16; 285/369
[58] Field of Search .............. 285/231, 223, 235, 224, 285/369, DIG. 16; 403/225

[56] References Cited

U.S. PATENT DOCUMENTS

| | | | |
|---|---|---|---|
| 1,906,057 | 4/1933 | Guy | 403/225 X |
| 2,742,770 | 4/1956 | Graham | 403/225 X |
| 2,785,259 | 3/1957 | Haydon | 403/225 X |
| 3,610,807 | 10/1971 | Whitehead | 285/224 |

FOREIGN PATENT DOCUMENTS 2261537 6/1973 Fed. Rep. of Germany ...... 285/235

*Primary Examiner*—Dave W. Arola
*Attorney, Agent, or Firm*—Sughrue, Mion, Zinn, Macpeak & Seas

[57] ABSTRACT

A flexible pipe coupling is disclosed. This coupling comprises a large diameter cylindrical hollow body, a pair of small diameter cylindrical hollow bodies each having one end portion disposed inside each end of the large diameter cylindrical hollow body on the same axial line, and an elastic sleeve member for connecting each end of the large diameter cylindrical hollow body to one end of each of the small diameter cylindrical hollow bodies. The elastic sleeve member is provided at its both ends adjacent to the cylindrical hollow bodies with protrusions each extending outwardly in the widthwise direction of the sleeve member at a radius of curvature corresponding to 0.1 ~ 0.4 times the thickness of the sleeve member, whereby the durability of the coupling is further improved.

3 Claims, 4 Drawing Figures

FLEXIBLE PIPE COUPLING

BACKGROUND OF INVENTION

This invention relates to flexible pipe couplings which are used for the connection of, for example, sewage pipes, gas pipes and the like to be embedded in ground and which are capable of accepting a displacement between the opposed connection pipes due to ground subsidence or the like.

A known coupling for underground pipes uses a bellows pipe, which is small in its acceptable displacement quantity per unit length. In order to accept a large displacement, the length of the bellows pipe must be lengthened, so that such a pipe has drawbacks in that the cost of the coupling is high and the workability becomes poor.

An attempt has been made to accept the large displacement between the opposed connection pipes by using as shown in FIG. 1 a flexible pipe coupling comprising a large diameter cylindrical hollow body a, a pair of small diameter cylindrical hollow bodies $b_1$, $b_2$ each having one end portion disposed inside each end of the large diameter cylindrical hollow body a on the same axial line, and an elastic sleeve member c for connecting each end of the large diameter cylindrical hollow body a to one end of each of the small diameter cylindrical hollow bodies $b_1$, $b_2$. However, such a coupling frequency causes trouble in durability for practical use.

SUMMARY OF INVENTION

It is, therefore, an object of the invention to improve considerably the durability of the aforementioned flexible pipe coupling.

According to the invention, there is the provision of a flexible pipe coupling comprising a large diameter cylindrical hollow body, a pair of small diameter cylindrical hollow bodies each having one end portion disposed inside each end of the large diameter cylindrical hollow body on the same axial line, and an elastic sleeve member for connecting each end of the large diameter cylindrical hollow body to one end of each of the small diameter cylindrical hollow bodies. The elastic sleeve member is provided at its both ends adjacent to the large and small diameter cylindrical hollow bodies with protrusions each extending outwardly in the widthwise direction of the sleeve member at a radius of curvature corresponding to 0.1~0.4 times the thickness of the sleeve member.

BRIEF DESCRIPTION OF THE DRAWING

The invention will now be described in detail with reference to the accompanying drawings, wherein.

DESCRIPTION OF THE PREFERRED EMBODIMENTS

Figure 1:
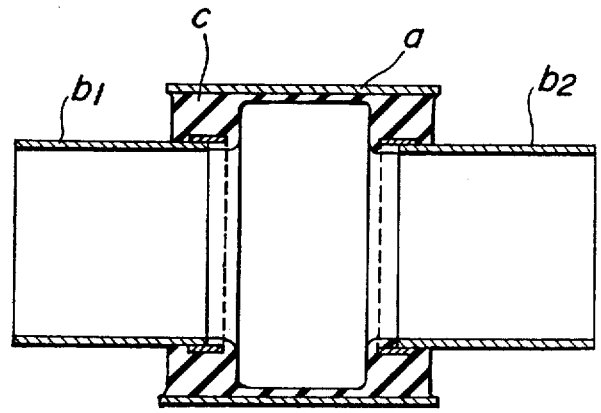
FIG. 1 is a cross-sectional view of the conventional flexible pipe coupling as mentioned above.
Figure 2:
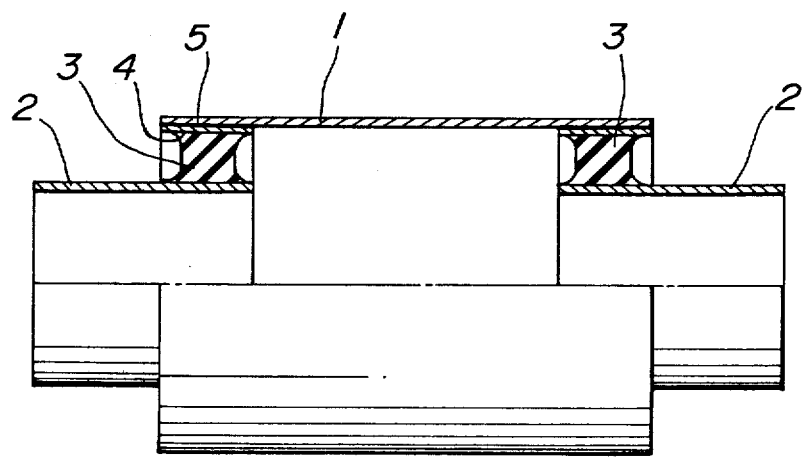
FIG. 2 is an elevational view in section of an embodiment of the flexible pipe coupling according to the invention.

In FIG. 2 is partly shown in section an embodiment of the flexible pipe coupling according to the invention, wherein numeral 1 represents a large diameter cylindrical hollow body, numeral 2 a small diameter cylindrical hollow body having one end portion disposed inside one end of the large diameter cylindrical hollow body 1 on the same axial line, and numeral 3 an elastic sleeve member for connecting ends of the large and small diameter cylindrical hollow bodies 1, 2 to each other.

The elastic sleeve member 3 has as a whole an annular form. In the illustrated embodiment, the inner periphery of the sleeve member 3 is directly bonded by curing to the outer surface of the small diameter cylindrical hollow body 2, while the outer periphery of the sleeve member 3 is bonded by curing to a rigid annular body 4. Then, the outer surface of the rigid annular body 4 is coated with an adhesive 5 and inserted into and bonded to the inner surface of the large diameter cylindrical hollow body 1. Hence, the cylindrical hollow bodies 1 and 2 are firmly connected to each other.

Moreover, the sleeve member 3 may directly be bonded by curing or with an adhesive to the cylindrical hollow bodies 1 and 2. Preferably, the inner periphery of the sleeve member is bonded by a highly reliable curing to the small diameter cylindrical hollow body 2 having a relatively small bonded surface, while the outer periphery of the sleeve member is directly bonded with an adhesive to the large diameter cylindrical hollow body 1. If desired, the sleeve member 3 may be bonded to the large diameter cylindrical hollow body 1 by pouring a liquid rubber or an epoxy adhesive into a depression about the outer periphery of the sleeve member through an aperture formed in the large diameter cylindrical hollow body.

Figure 3:
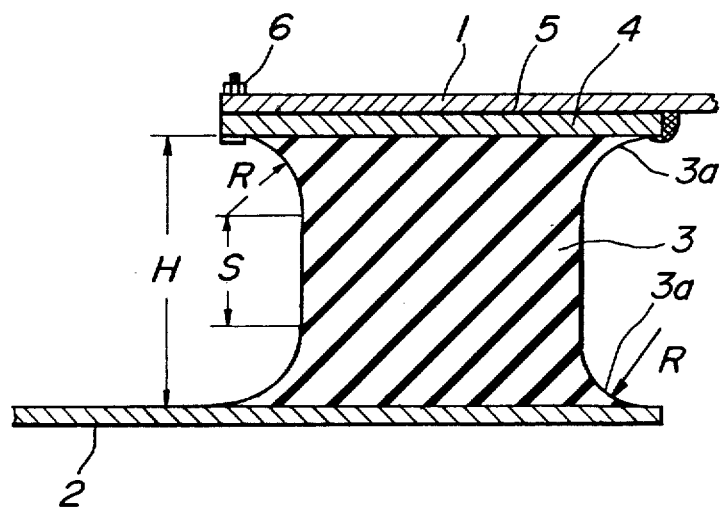
FIG. 3 is a fragmentarily enlarged sectional view of the coupling shown in FIG. 2.

FIG. 3 illustrates, in an enlargement an essential part of the flexible pipe coupling shown in FIG. 2. The elastic sleeve member 3 is provided at its both ends adjacent to the large and small diameter cylindrical hollow bodies 1 and 2 (in the illustrated embodiment, the outer periphery of the sleeve member 3 is adjacent to the large diameter cylindrical hollow body 1 through the rigid annular body 4 and adhesive layer 5) with protrusions each extending outwardly in the widthwise direction of the sleeve member at a radius of curvature corresponding to 0.1~0.4 times the thickness H of the sleeve member. Therefore, the sleeve member 3 has a straight portion S corresponding to 0.2~0.8 times the thickness H of the sleeve member.

When the sleeve member 3 having such protrusions is bonded to the small diameter cylindrical hollow body 2 and the rigid annular body 4 or large diameter cylindrical hollow body 1, the connecting strength is considerably increased as compared with the case of using a sleeve member composed only of a straight portion. Also, even if a large displacement is caused between the opposed connection pipes connected through the coupling, the local stress concentration is considerably mitigated at the bonded surface of the sleeve member 3 to the large or small diameter cylindrical hollow body as well as the inside of the sleeve member owing to the presence of the protrusions. Furthermore, when internal pressure is applied to the flexible pipe coupling, the inner protrusions 3a of the sleeve member 3 are pressed against the small diameter cylindrical hollow body 2 and the rigid annular body 4 (or larger diameter cylindrical hollow body 1), so that the leakage of internal fluid can be prevented more surely.

As shown in FIG. 3, the inner protrusion 3a of the sleeve member 3 may be extended to the free edge of the rigid annular body 4 and bonded thereto. In this case, the connecting strength may further be increased.

In FIG. 3, numeral 6 represents a bolt and nut arranged at the edge of the large diameter cylindrical hollow body 1 in order to increase the bonding power between the rigid annular body 4 and the large diameter cylindrical hollow body 1, which act to mitigate the stress produced between the rigid annular body 4 and the large diameter cylindrical hollow body under an influence of internal pressure.

Figure 4:
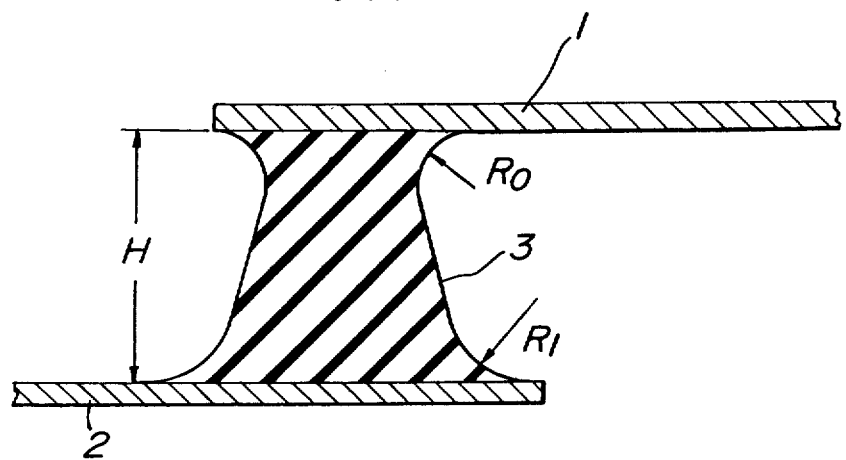
FIG. 4 is a fragmentarily enlarged sectional view of another embodiment of the flexible pipe coupling according to the invention.

FIG. 4 illustrates another embodiment of the flexible pipe coupling according to the invention. In this embodiment, the elastic sleeve member 3 is directly bonded by curing to the large and small diameter cylindrical hollow bodies 1 and 2, respectively and also the width of the sleeve member is gradually converged toward the large diameter cylindrical hollow body 1.

Of course, the sleeve member 3 of this illustrated embodiment is provided at its both ends with such protrusions that radii of curvature $R_0$, $R_1$ are within a range of $0.1 \sim 0.4$ times the thickness H of the sleeve member. In this embodiment, not only can the bonded surface of the sleeve member 3 to the small diameter cylindrical hollow body 2 be increased, but also the width of the sleeve member 3 diverges toward the small diameter cylindrical hollow body 2. The stress distribution in the thickness direction of the sleeve member becomes more uniform and hence the durability of the coupling is further improved.

According to the invention, the displacement between the opposed connection pipes connected through the coupling is primarily accepted due to the shearing deformation of the elastic sleeve member having a large displacement quantity per unit load, so that the flexible pipe coupling according to the invention is capable of accepting a large displacement between the opposed connection pipes under a small load. Furthermore, the elastic sleeve member according to the invention, which is provided at its both ends with protrusions having a particular radius of curvature, is bonded to the ends of the large and small diameter cylindrical hollow bodies, respectively, so that the stress concentration can be removed at the bonded surface and inside of the sleeve member to improve the durability of the flexible pipe coupling. Moreover, when the elastic sleeve member is bonded with an adhesive to the large diameter cylindrical hollow body, the sleeve member coated at its outer periphery with the adhesive is merely inserted into the large diameter cylindrical hollow body, so that the flexible pipe coupling having a desired length can easily be manufactured.

What is claimed is:

1. A flexible pipe coupling comprising; a large diameter cylindrical hollow body, a pair of small diameter cylindrical hollow bodies each having one end portion disposed inside each end of said large diameter cylindrical hollow body on the same axial line, and means connecting each end of said large diameter cylindrical hollow body to one end of each of said small diameter cylindrical hollow bodies, said means including an elastic sleeve member positioned substantially at each end of said large diameter cylindrical hollow body, each of said elastic sleeve members having two ends and a radial thickness and being provided at its both ends adjacent to said large and small diameter cylindrical hollow bodies with protrusions each extending axially outwardly from said ends in the widthwise direction of said sleeve member at a radius of curvature corresponding to $0.1 \sim 0.4$ times the radial thickness of said sleeve member, and said sleeve member having a straight portion between said protrusions corresponding to $0.2 \sim 0.8$ of its radial thickness.

2. A flexible pipe coupling as claimed in claim 1, wherein a rigid annular body is inserted between said elastic sleeve member and large diameter cylindrical hollow body.

3. A flexible pipe coupling as claimed in claim 1, wherein said elastic sleeve member converges toward said large diameter cylindrical hollow body.

* * * * *